(12) United States Patent
Nava et al.

(10) Patent No.: US 11,623,383 B2
(45) Date of Patent: Apr. 11, 2023

(54) BLOWING OR STRETCH-BLOWING MACHINE FOR BOTTLES MADE OF POLYMER MATERIAL

(71) Applicant: SMI S.P.A., Bergamo (IT)

(72) Inventors: Angelo Nava, Bergamo (IT); Damiano Pesenti, Bergamo (IT)

(73) Assignee: SMI S.P.A., Bergamo (IT)

( * ) Notice: Subject to any disclaimer, the term of this patent is extended or adjusted under 35 U.S.C. 154(b) by 0 days.

(21) Appl. No.: 17/573,275

(22) Filed: Jan. 11, 2022

(65) Prior Publication Data

US 2022/0219375 A1 Jul. 14, 2022

(30) Foreign Application Priority Data

Jan. 11, 2021 (IT) .......................... 102021000000323

(51) Int. Cl.
*B29C 49/56* (2006.01)
*B29C 49/32* (2006.01)
(Continued)

(52) U.S. Cl.
CPC .............. *B29C 49/56* (2013.01); *B29C 49/32* (2013.01); *B29C 49/4236* (2013.01);
(Continued)

(58) Field of Classification Search
CPC . B29C 49/56; B29C 49/5607; B29C 49/5613; B29C 49/4236; B29C 49/42362; B29C 2049/4894; B29C 49/32
See application file for complete search history.

(56) References Cited

U.S. PATENT DOCUMENTS

2010/0156009 A1\* 6/2010 Voth .................... B29C 49/4236
425/538
2010/0203185 A1 8/2010 Litzenberg et al.
(Continued)

FOREIGN PATENT DOCUMENTS

DE    23 59 219 A1    6/1975
EP    2 942 179 A1    11/2015
(Continued)

OTHER PUBLICATIONS

Italian Search Report for Italian Patent Application No. 102021000000323 dated Sep. 28, 2021, 7 pages.

*Primary Examiner* — Robert B Davis
(74) *Attorney, Agent, or Firm* — Merchant & Gould P.C.

(57) ABSTRACT

A machine for blowing or stretch-blowing bottles or containers made of a polymer material includes molds movable on a transport system. Each mold includes a front, back, and bottom with a first and second half-molds hinged about a hinge axis and a base. Each of the molds includes a mechanism for synchronized actuation of the half-molds and the base independently from the machine's motor, to cyclically form with shaped portions, a closed cavity for receiving a preheated preform and to allow expansion by blowing or stretch-blowing the preform inside the cavity to obtain a bottle or container. The base is wedge-shaped with a horizontal closing surface facing the bottom of the mold, and an inclined surface. The actuation mechanism includes a wedge-shaped element having a surface inclining towards the front of the mold. The inclined surfaces of the base and of the wedge-shaped element are) being slidingly coupled.

10 Claims, 3 Drawing Sheets

(51) Int. Cl.
*B29C 49/42* (2006.01)
*B29C 49/48* (2006.01)

(52) U.S. Cl.
CPC ........ *B29C 49/42362* (2022.05); *B29C 49/48* (2013.01); *B29C 49/5607* (2022.05); *B29C 49/5613* (2022.05); *B29C 2049/4894* (2013.01)

(56) References Cited

U.S. PATENT DOCUMENTS

| | | | | |
|---|---|---|---|---|
| 2010/0203187 | A1* | 8/2010 | Schmid | B29C 49/56 |
| | | | | 425/541 |
| 2016/0001487 | A1* | 1/2016 | Yang | B29C 49/56 |
| | | | | 425/540 |
| 2016/0361858 | A1* | 12/2016 | Nava | B29C 49/48 |

FOREIGN PATENT DOCUMENTS

| | | | |
|---|---|---|---|
| EP | 2 218 569 | A2 | 8/2020 |
| FR | 1 307 954 | A | 11/1962 |

* cited by examiner

BLOWING OR STRETCH-BLOWING MACHINE FOR BOTTLES MADE OF POLYMER MATERIAL

This application claims benefit of Ser. No. 102021000000323, filed 11 Jan. 2021 in Italy, and which application is incorporated herein by reference. To the extent appropriate, a claim of priority is made to the above-disclosed application.

FIELD OF THE INVENTION

The present invention relates to a blowing or stretch-blowing machine for preforms made of polymer material adapted to transform said preforms into bottles or containers, and in particular to the forming half-mold closing mechanism.

BACKGROUND ART

Obtaining bottles or containers by blowing suitable appropriately heated preforms in a mold of the desired shape is a widely known technique in the packaging sector, in particular for making bottles or containers.

There are substantially two different techniques, simple blowing, and stretch-blowing, which include pneumatic blowing and the concurrent mechanical stretching of the preform in the mold. In both cases, the preforms must reach the blowing or stretch-blowing machine in a thermal condition which correspond to the softening point of the material, to be able to be plastically deformed inside the molds.

Blowing or stretch-blowing machines for preforms are known and comprise a plurality of openable molds comprising two half-molds hinged at an end and actuated by appropriately arranged leverages sized to allow the opening and closing thereof in a synchronized manner with predetermined steps of loading of the preforms and unloading of the already formed bottle. Such leverages are generally operated by a shaped cam coupling, such a coupling being adapted to provide an alternating motion with a pattern defined by the shape of the cam itself.

In rotary machines, a plurality of molds is arranged radially about a central rotation axis, and means for opening and closing the molds are synchronized with the movement of other devices which cooperate in the operation of the machine, e.g., a movement device for the entering preforms and the exiting bottles, or a blowing and moving device for different components of the molds.

The conventional mold movement and opening/closing systems are complex and, above all, not very versatile. Indeed, to modify the opening/closing profile it is necessary to replace the cam system with a different one in which the profile of the cam corresponds to the new movement. Furthermore, by implying the use of complex mechanical movement transmission systems, the conventional machines are subject to high wear and thus to frequent and careful maintenance.

Semi-mold opening/closing systems are also known which include the use of a dedicated motorization, but also in this case the levers used are complex, especially for the movement of the bottom plate, which can result in the need for greater maintenance and therefore downtime of the system. Furthermore, the presence of the motorization can lead to an increase in the size of the blowing or stretch blowing unit, which is incompatible with the requirements of compact and small dimensions systems.

SUMMARY OF THE INVENTION

The problem addressed by the present invention is to make available a blowing or a stretch-blowing machine for bottles made of plastic material that makes it possible to overcome the disadvantages illustrated above and which is thus simpler to construct, requiring less maintenance and more compactness.

Such a problem is solved by a machine as outlined in the accompanying claims, the definitions of which form an integral part of the present description.

In particular, the invention relates to a machine for blowing or stretch-blowing bottles or containers made of a polymer material having a plurality of molds which are movable on a transport system, wherein each of said molds has a front, a back, and a bottom and comprises a first half-mold and a second half-mold hinged about a hinge axis and a base, wherein each of said molds comprises a mechanism for the synchronized actuation of the half-molds and the base actuated by an actuator thereof, which is independent from the motorization of the machine, to cyclically form, in cooperation with suitable shaped portions, a closed cavity adapted to receive a preheated preform and to allow the expansion by blowing or stretch-blowing of the preform inside the cavity to obtain a bottle or container, wherein the base is wedge-shaped and comprises a horizontal closing surface, facing the bottom of the mold, and an inclined surface, and in that the actuation mechanism of the base comprises a wedge-shaped element having an inclined surface with an inclination descending towards the front of the mold, said inclined surface of the base and inclined surface of the wedge-shaped element being slidingly coupled to each other.

Further features and advantages of the present invention will become more apparent from the description of certain embodiments thereof, given hereafter only by way of a non-limiting, indicative example.

DETAILED DESCRIPTION OF THE INVENTION

Figure 1:
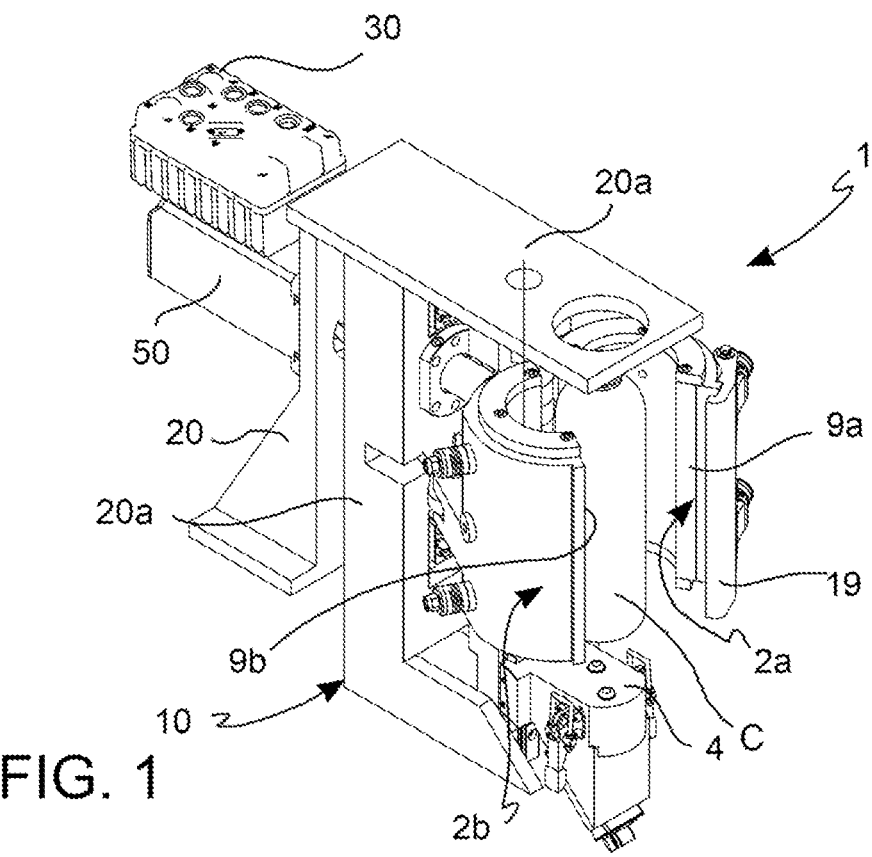
FIG. 1 shows a perspective top view of a blowing or stretch-blowing unit according to the invention.

With reference to the figures, reference numeral 1 indicates as a whole an injection forming mold of a container in blowing or stretch-blowing machines. Typically, a blowing or stretch-blowing machine according to the invention is of the rotary type and comprises a plurality of molds 1 arranged radially relative to a substantially vertical rotation axis of the machine.

By turning about the rotation axis of the machine, each mold 1 is cyclically carried to a loading station of a preform and/or an unloading station of a bottle C obtained from the preform. The blowing or stretch-blowing is performed between the loading of the preform and the unloading of the bottle.

The mold 1 comprises a front, back, and bottom. Each mold 1 is mounted on a bracket 20 fixed to the carousel and comprises a first half-mold 2a and a second half-mold 2b hinged about a hinge axis 3, normally parallel to the rotation axis of the machine. The hinge axis 3 is arranged at an end of the half-molds 2a, 2b facing towards the axis of the machine (back of mold 1), while the half-molds 2a, 2b on the opposite end (front of mold 1) comprise edges 9a, 9b intended to face each other when the mold 1 is closed.

Each half-mold 2a, 2b is C-shaped in cross-section, comprising a front portion 37a, 37b, a side portion 38a, 38b, and a rear portion 39a, 39b.

Figure 4:
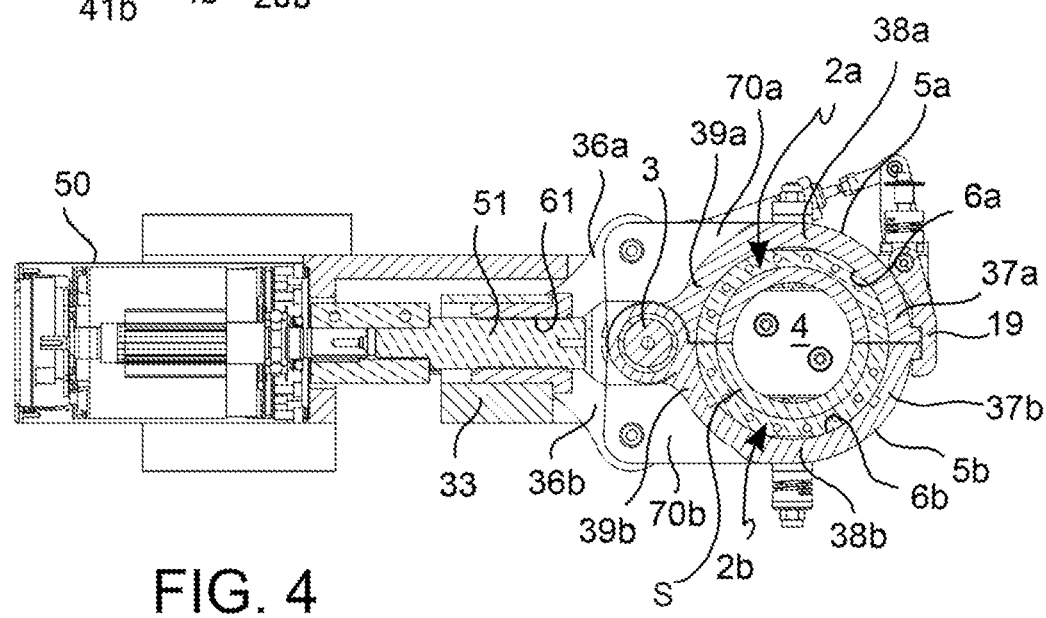
FIG. 4 shows a simplified top sectional view (in which the mold support and bracket have been omitted) of the blowing or stretch-blowing unit of FIG. 1 in an initial operating condition.
Figure 5:
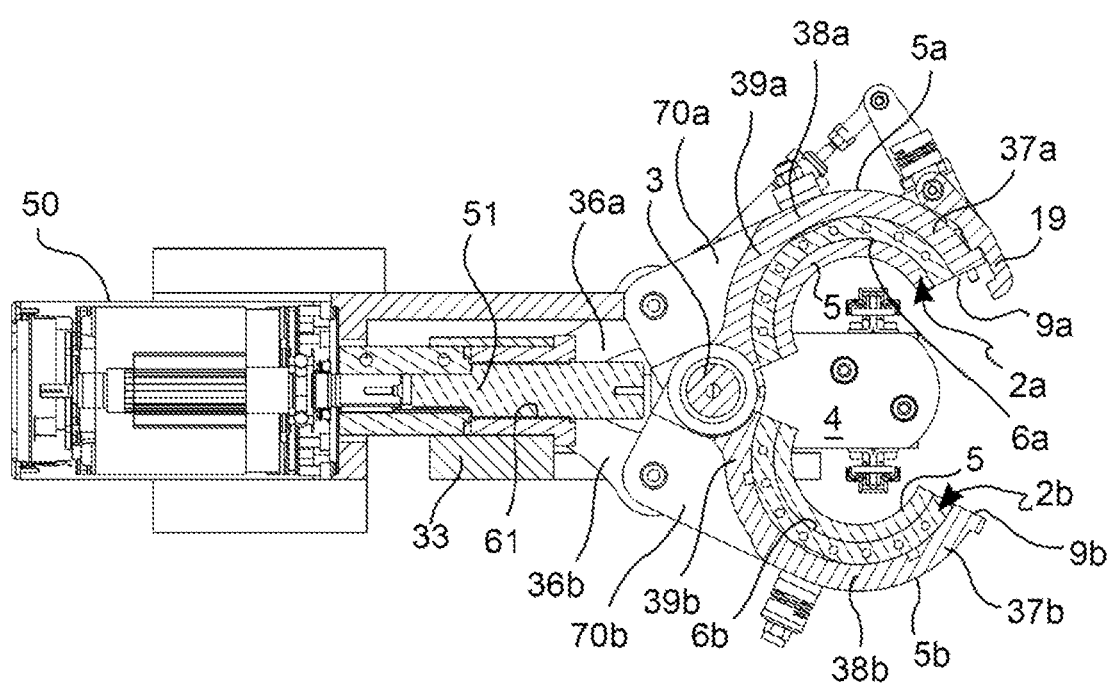
FIG. 5 shows the view in FIG. 4 in a different operating condition.

The first half-mold 2a and the second half-mold 2b can thus turn about the hinge axis 3 between a closed mold configuration (FIG. 4) and an open mold configuration (FIGS. 1 and 5). The half-molds 2a, 2b can thus be opened/closed like two shells of a bivalve shell.

The mold 1 comprises a base 4 adapted to cooperate with the half-mold 2a, 2b for closing the bottom of the mold 1 and bottom plate (base) vertical movement means, for cyclically forming a closed cavity adapted to receive a preheated preform and for allowing the expansion of the preform by blowing or stretch-blowing inside the cavity to obtain a bottle or a container.

The half-molds 2a, 2b comprise an outer face 5a, 5b, and an inner face 6a, 6b, respectively. Respectively shaped portions S are applied onto the inner faces 6a, 6b, which portions taken as a whole, with the mold closed, negatively mimic the outer shape of the bottle C to be obtained from the preform and delimit the space in which the preform is expanded.

In some embodiments, such a shaped portion S can be separated from the half-molds 2a, 2b and is interchangeable, to allow the forming of bottles C having different shapes and sizes. In such a manner, it is sufficient to replace the shaped portions S to start the production of different bottles.

The half-molds 2a, 2b comprise a bottom opening from which the lower part of the shaped portions S protrude, the shaped portions S having, in turn, a bottom opening at a bottom portion of the bottle to be obtained, said opening adapted to be closed with an alternate motion by the aforesaid base 4.

On one of the two half-molds 2a, 2b (on the right half-mold 2a in the example in the figures) a closing element 19 of the mold 1 is rotationally mounted, the closing element being adapted to keep the half-molds 2a, 2b joined during the blowing or stretch-blowing process.

The movement mechanism of the closing element 19 and the retaining system of the half-molds is described in patent application EP15164317.8 filed on 20 Apr. 2015 by the same Applicant.

The mold 1 further comprises a support 10 that comprises an L-shaped element 10a to which the mold 1 is hinged.

The blowing and stretch-blowing machine of containers according to the present invention is characterized in that it includes an opening/closing system of the half-molds 2a, 2b, and of the base 4 which has an independent motorization instead of the actuation cam. Thus, each mold 1 of the blowing and stretch-blowing machine comprises its own motorization which will open/close the half-molds 2a, 2b, and base 4 and will be independent of the motorization of the machine which in turn transports the molds 1 along the working path.

The aforesaid motorization for the opening/closing the half-molds 2a, 2b, and the base 4 is an actuator with a rotary movement. Preferred examples of actuators are stepper motors, preferably rotating brushless motors.

The mold 1 according to the invention thus comprises an actuator 30 arranged horizontally that moves a single synchronized actuation mechanism 40 of the half-mold 2a, 2b and of the base 4.

This embodiment, as described in better detail below, further to allowing greater control of the blowing or stretch-blowing process, it has the advantage of reducing vibrations, noise, and wear of the machine by virtue of the fact that it is free of mechanical cams.

In the example shown, the actuator 30 is either a stepper or a brushless motor of the rotary type and is fixed to the bracket 20. The bracket 20 comprises a plate 20a projecting onto the mold 1, so that the half molds 2a, 2b result contained between the L-shaped element 10a and said plate 20a. The rotary actuator 30 is connected, by a transmission member 50, to an Archimedes' screw 51.

The actuation mechanism 40 comprises a sliding member 33 having a tubular cavity 61, arranged along a horizontal straight line which lies on the vertical plane which divides the two half-molds 2a, 2b, inside which cavity 61 the Archimedes' screw 51 is inserted. Appropriate bosses present on the inner surface of the tubular cavity 61 cooperate with the grooves of the Archimedes' screw 51 so that the sliding member 33 either advances or retreats according to the rotation direction of the Archimedes' screw 51 when the latter rotates.

The sliding member 33 is associated with a first slide 34a, positioned above the sliding member 33 and slidingly mounted to guiding means 35. The guiding means 35 are fixed and are mounted on the bracket 20. The sliding member 33 may thus slide between an advanced position (or closing position) and a retreated position (or opening position).

The sliding member 33 is also integral on the bottom with a connecting element 33', which in turn is connected to a second slide 34b slidingly mounted on respective guiding means 35' fixed to the bracket 20.

The connecting element 33' is associated with the two half-molds 2a, 2b by respective connecting rods 36a, 36b.

The first ends of the two connecting rods 36a, 36b are coaxially hinged onto the connection element 33', while the opposite ends are hinged at respective joint elements 70a, 70b between the side portions 38a, 38b and the rear portions 39a, 39b of the half-molds 2a, 2b. In this manner, as shown in particular in FIGS. 4 and 5, when the sliding member 33 is in the advanced position, the half-molds 2a, 2b are facing along the edges 9a, 9b, and the mold 1 is closed; conversely, when the sliding member 33 is in the retracted position (FIG. 5), the connecting rods 36a, 36b act on the hinge points with the half-molds 2a, 2b, taking them into the open position.

It is apparent that all intermediate positions of the sliding member 33 along the guide means 35 correspond to a different degree of opening of the half-molds 2a, 2b. As will be explained better below, the possibility of defining a different degree of opening of the half-molds 2a, 2b as a function of the size of the container to be formed makes it possible to optimize the processing times: indeed, for small-size containers it will not be necessary to open the molds completely to load the preform and unload the formed container, thus reducing the overall time for each working step and making it possible to speed up the production cycle. This is also the case of larger containers because it will still be possible to open the half-molds 2a, 2b only partially to load the preforms, which are small.

Another advantage connected to only partial opening of the half-molds 2a, 2b resides in the decrease of the forces in hand and of the vibrations of the machine.

The sliding member 33 is also operatively connected to an opening-closing mechanism of the base 4.

The second slide 34b is integral with an L-shaped element 41 comprising a horizontal portion 41a facing in the direction of the mold face 1. The horizontal portion 41a anteriorly comprises a wedge-shaped element 41b having an inclined surface 41c with an inclination descending towards the mold face 1.

The horizontal portion 41a of the L-shaped element 41 slides through the bracket 20, in particular through a vertical plate 20b facing the front of the mold 1 and comprises a guide on which a third slide 34c associated with the base 4 slides vertically.

The base 4 is wedge-shaped and comprises a horizontal closing surface 4a facing the bottom of the mold 1 and an inclined surface 4b having an inclination complementary to that of the wedge-shaped element 41b. The inclined surface 4b comprises a fourth slide 34d sliding in a guide formed on the wedge-shaped element 41b.

Figure 2:
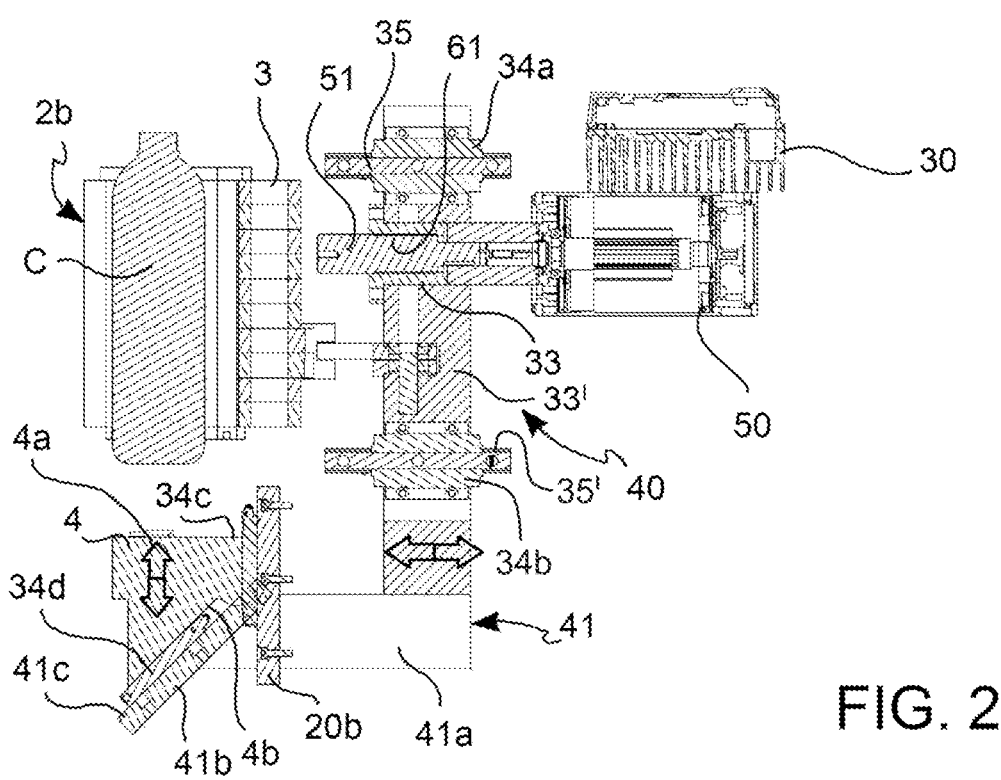
FIG. 2 shows a simplified side sectional view (in which the mold support and bracket have been omitted) of the blowing or stretch-blowing unit of FIG. 1 in an initial operating condition.
Figure 3:
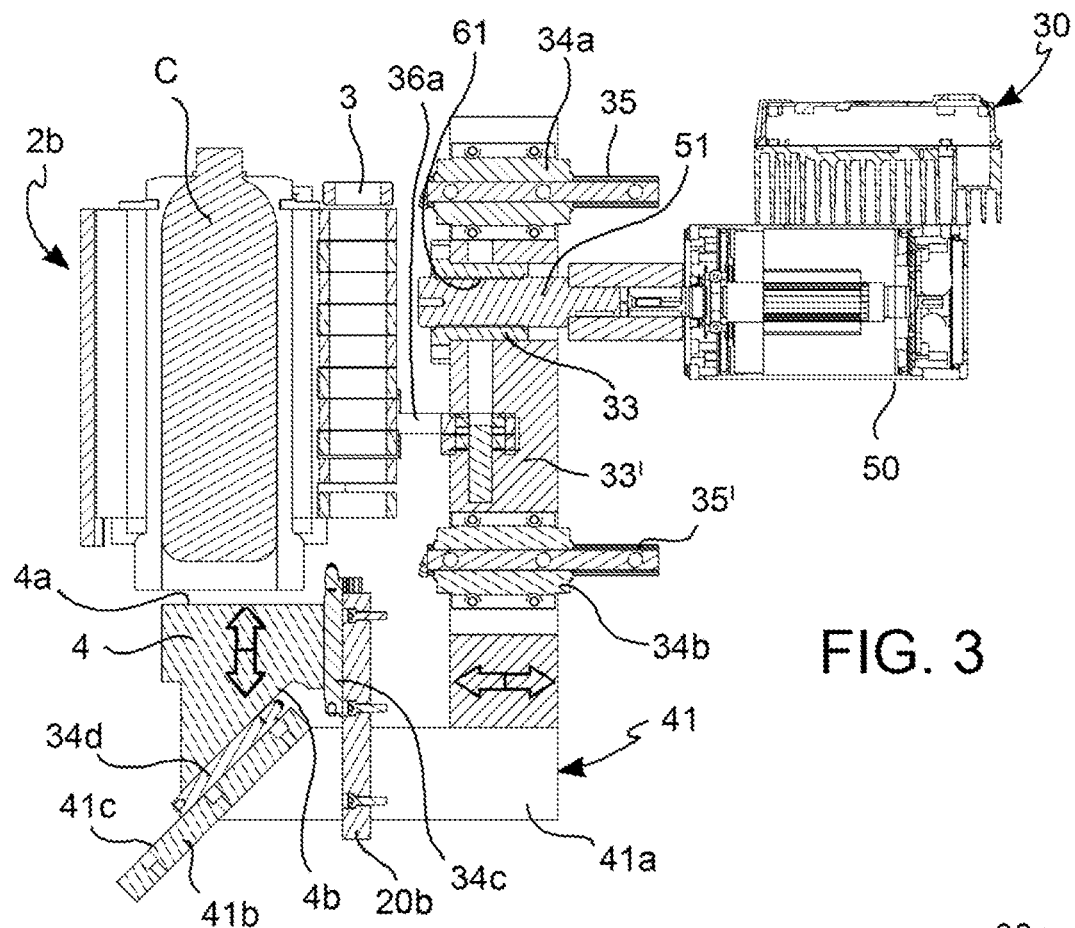
FIG. 3 shows the view in FIG. 2 in a different operating condition.

Therefore, when the sliding element 33, by the effect of the rotation of the Archimedes' screw 51, is in a retracted position (FIG. 2), the wedge element 41b integral therewith is also in a retracted position, so that the base 4 is in a lowered opening position. On the other hand, when the sliding element 33, and thus also the wedge element 41b, are in the advanced position (FIG. 3), the base 4 is pushed upwards by the action of the wedge and is in the closed position.

This mechanism is particularly advantageous in that it minimizes linkages, so it is constructively simple and requires little maintenance.

In preferred embodiments, the blowing and stretch-blowing machine or the mold 1 comprise a command and control unit configured to govern the motion law for opening/closing the individual molds 1 thus making it possible to provide predefined opening/closing cycles for every type of container C to be formed. For example, an incomplete opening of the molds may be provided if the container C to be formed is small in size, thus obtaining an increase of productivity, as mentioned above.

This is a considerable advantage with respect to conventional machines because no replacement of mechanical parts (cam profiles) is required.

In some embodiments, the command and control unit is configured to govern the overall operation of the machine and to perform the following functions:
  reading the pressure sensors inside the molds
  commanding the processing times
  adjusting the parameters of the blowing process
  actuating the alarm signals
  adjusting the heating of the preforms
  adjusting the operating speed of the machine.

It is apparent that only a few particular embodiments of the present invention have been described, to which the person skilled in the art will be able to make all of the necessary changes for the adaptation thereof to particular applications, without however departing from the scope of protection of the present invention.

What we claim is:

1. A machine for blowing or stretch-blowing bottles or containers made of a polymer material having a plurality of molds which are movable on a transport system, wherein each of said molds has a front, a back, and a bottom and comprises a first half-mold and a second half-mold hinged about a hinge axis and a base, wherein each of said molds comprises: an actuation mechanism for synchronized actuation of the half-molds and the base actuated by an actuator, which is independent from motorization of the machine, to cyclically form, in cooperation with shaped portions, a closed cavity adapted to receive a preheated preform and to allow expansion by blowing or stretch-blowing of the preform inside the cavity to obtain a bottle or container, wherein the base is wedge-shaped and comprises a horizontal closing surface, facing the bottom of the mold, and an inclined surface, and wherein the actuation mechanism of the base comprises a wedge-shaped element having an inclined surface with an inclination descending towards the front of the mold, said inclined surface of the base and inclined surface of the wedge-shaped element being slidingly coupled to each other.

2. The machine according to claim 1, wherein the actuation mechanism comprises a sliding member having a tubular cavity, arranged along a horizontal straight line lying on a vertical plane which divides the two half-molds, an Archimedes' screw having a thread being operatively inserted into the cavity, wherein an inner surface of the tubular cavity comprises projections which cooperate with the thread of the Archimedes' screw so that, when the Archimedes' screw rotates, the sliding member moves forward or backward according to a rotation direction of the Archimedes' screw.

3. The machine according to claim 2, wherein the sliding member is associated with a first slide, positioned above the sliding member and slidingly mounted to a fixed guide.

4. The machine according to claim 2, wherein a bottom of the sliding member is integral to a connecting element, which is connected, in turn, to a second slide slidingly mounted to a respective fixed guide, said connecting element being associated with the two half-molds by respective connecting rods having first and second ends.

5. The machine according to claim 4, wherein the first ends of the connecting rods are coaxially hinged on the connecting element, and wherein the second ends are hinged at respective junction elements between respective side portions and respective rear portions of the half-molds, so that, when the sliding member is in an advanced position, the half-molds face each other along respective edges and the mold is closed; and when the sliding member is in a retracted position, the connecting rods act on hinging points with the half-molds bringing the half-molds to an open position.

6. The machine according to claim 4, wherein the second slide is integral with an L-shaped element comprising a horizontal portion facing the front of the mold, wherein the horizontal portion comprises said wedge-shaped element at the front.

7. The machine according to claim 1, wherein the mold comprises a support of the mold and a fixed bracket, said bracket comprising a vertical plate facing the front of the mold and comprising a guide on which a third slide associated with the base slides vertically.

8. The machine according to claim 7, wherein the inclined surface of the base comprises a fourth slide sliding in a guide formed on the wedge-shaped element.

9. The machine according to claim 1, wherein the machine or the mold comprise a command and control unit configured to govern a law of motion for opening/closing the individual molds, said law of motion being provided for a total and/or partial opening of the half-molds.

10. The machine according to claim 9, wherein the command and control unit is configured to govern operation of the machine and to perform the following functions:
- reading pressure sensors inside the molds;
- commanding processing times;
- adjusting parameters of the blowing;
- actuating alarm signals;
- adjusting heating of the preforms;
- adjusting operating speed of the machine.

\* \* \* \* \*